(12) United States Patent
Fujimoto et al.

(10) Patent No.: US 7,561,769 B2
(45) Date of Patent: Jul. 14, 2009

(54) OPTICAL FIBER FOR IRRADIATION-LIGHT TRANSFER AND LIGHT IRRADIATION DEVICE EQUIPPED WITH THE SAME

(75) Inventors: Miyoko Fujimoto, Kanagawa (JP); Kazuhiro Okamoto, Kanagawa (JP); Hiroshi Kohda, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/593,278

(22) PCT Filed: Mar. 15, 2005

(86) PCT No.: PCT/JP2005/005047

§ 371 (c)(1),
(2), (4) Date: Oct. 10, 2007

(87) PCT Pub. No.: WO2005/088369

PCT Pub. Date: Sep. 22, 2005

(65) Prior Publication Data

US 2008/0279523 A1    Nov. 13, 2008

(30) Foreign Application Priority Data

Mar. 16, 2004  (JP) ............................. 2004-074937

(51) Int. Cl.
*G02B 6/42* (2006.01)
(52) U.S. Cl. .......................................... 385/32; 385/30
(58) Field of Classification Search .................. 385/22, 385/28, 30, 50, 78, 88, 32
See application file for complete search history.

(56) References Cited

U.S. PATENT DOCUMENTS 4,184,740 A    1/1980  D'Auria et al.

(Continued)

FOREIGN PATENT DOCUMENTS

GB    2 049 985    12/1980

(Continued)

OTHER PUBLICATIONS

International Preliminary Report on Patentability and Written Opinion of The International Searching Authority issued in International Application No. PCT/JP2005/005047, dated Sep. 19, 2006.

(Continued)

*Primary Examiner*—James P Hughes
*Assistant Examiner*—Peter Radkowski
(74) *Attorney, Agent, or Firm*—McDermott Will & Emery LLP

(57) ABSTRACT

An object of this invention to transfer the light emitted from the light source and exit the light with a uniform distribution of light quantity, without incurring transfer loss and an increase of costs.

In this invention, an optical fiber 11 for irradiation-light transfer of a single major optical fiber element composed of a core 12 and a clad 13 is bent in its intermediate region in an annular shape to form an annular portion 14. The crossing zone at the annular portion is fixed by a fixing member 15. By incidenting light from its incidence terminal 11a, variations in the distribution of light quantity are eliminated at the annular portion 14 so that the light with distribution of light made uniform is exited from an exit terminal 11b.

19 Claims, 9 Drawing Sheets

U.S. PATENT DOCUMENTS

| | | | |
|---|---|---|---|
| 4,223,978 A * | 9/1980 | Kummer et al. | 385/22 |
| 4,896,935 A * | 1/1990 | Lee | 385/22 |
| 4,922,309 A | 5/1990 | Sekiwa et al. | |
| 4,953,942 A * | 9/1990 | Sasaki | 385/105 |
| 4,991,922 A * | 2/1991 | Dahlgren | 385/50 |
| 5,068,515 A * | 11/1991 | van den Bergh et al. | 219/121.73 |
| 5,159,655 A * | 10/1992 | Ziebol et al. | 385/81 |
| 5,268,986 A | 12/1993 | Kakii et al. | |
| 5,317,659 A * | 5/1994 | Lee | 385/22 |
| 5,351,327 A * | 9/1994 | Lurie et al. | 385/78 |
| 5,408,551 A * | 4/1995 | Maria van Woesik | 385/28 |
| 5,446,810 A * | 8/1995 | Watanabe et al. | 385/22 |
| 5,764,836 A * | 6/1998 | Roff | 385/88 |
| 5,862,276 A * | 1/1999 | Karras | 385/30 |
| 6,217,231 B1 * | 4/2001 | Mesaki et al. | 385/88 |
| 6,310,999 B1 * | 10/2001 | Marcuse et al. | 385/42 |
| 6,404,954 B1 * | 6/2002 | Zhu et al. | 385/34 |
| 6,532,244 B1 | 3/2003 | Dewey et al. | |
| 6,599,029 B2 * | 7/2003 | Yamazaki et al. | 385/80 |
| 6,697,542 B2 * | 2/2004 | Platzman et al. | 385/5 |
| 6,701,040 B2 * | 3/2004 | Li et al. | 385/34 |
| 6,711,322 B1 * | 3/2004 | Kohda et al. | 385/22 |
| 6,744,944 B2 * | 6/2004 | Matsuura et al. | 385/24 |
| 6,839,475 B2 * | 1/2005 | Kawase et al. | 385/14 |
| 6,937,781 B2 * | 8/2005 | Shirane et al. | 385/16 |
| 6,937,808 B2 * | 8/2005 | Kawase et al. | 385/137 |
| 6,964,523 B2 * | 11/2005 | Kohda et al. | 385/59 |
| 2002/0118929 A1 * | 8/2002 | Brun et al. | 385/84 |
| 2003/0081897 A1 * | 5/2003 | Itoh et al. | 385/34 |
| 2004/0062478 A1 * | 4/2004 | Ludington et al. | 385/33 |
| 2004/0126072 A1 * | 7/2004 | Hoon Lee et al. | 385/122 |

FOREIGN PATENT DOCUMENTS

| | | |
|---|---|---|
| JP | 53-45251 | 4/1978 |
| JP | 57-28407 U | 2/1982 |
| JP | 1-124723 | 5/1989 |
| JP | 4-251214 | 9/1992 |
| JP | 5-257029 | 10/1993 |
| JP | 5-303018 | 11/1993 |
| JP | 6-233778 | 8/1994 |
| JP | 8-103508 | 4/1996 |
| JP | 8-122539 | 5/1996 |
| JP | 8-179129 | 7/1996 |
| JP | 8-254623 | 10/1996 |
| JP | 9-43437 | 2/1997 |
| JP | 9-127424 | 5/1997 |
| JP | 9-304629 | 11/1997 |
| JP | 2002-090686 | 3/2002 |
| JP | 2002-133926 | 5/2002 |
| JP | 2002-150820 | 5/2002 |
| JP | 2002-202442 | 7/2002 |
| JP | 2002-289016 | 10/2002 |
| WO | WO 97/18920 | 5/1997 |
| WO | WO 01/86334 A1 | 11/2001 |

OTHER PUBLICATIONS

Amirkhanian, V. and Lee, W.I., "Mode Mixing in Fiber Optic Oximeter," Proceedings of the SPIE, vol. 1201, 1990, pp. 332-337, XP002510384.

European Search Report issued in European Patent Application No. EP 05721197.1-2216 dated Mar. 6, 2009.

* cited by examiner

OPTICAL FIBER FOR IRRADIATION-LIGHT TRANSFER AND LIGHT IRRADIATION DEVICE EQUIPPED WITH THE SAME

This application is a national phase of PCT/JP2005/005047 filed on Mar. 15, 2005, which claims priority from Japanese Application No. 2004-074937 filed Mar. 16, 2004, the disclosures of which Applications are incorporated by reference herein. The benefit of the filing and priority dates of the International and Japanese Applications is respectfully requested.

TECHNICAL FIELD

This invention relates to an optical fiber for irradiation-light transfer which is employed to transfer irradiation-light emitted from a light source and also relates to a light irradiation device equipped with the same.

RELATED ART

In recent years, in a light irradiation device for irradiating with illumination light transferred from a light source, an optical fiber has been employed for its transfer.

In a light irradiation device as shown in FIG. 16, light emitted from a light source 1 incidents in an optical fiber 3 through an optical beam control system 2, and the light is exited from an exit terminal of the optical fiber 3. The light exited from an optical rod 4 provided at the exit terminal of the optical fiber 3 is projected onto an tested object 6 through a projecting optical system 5, thereby testing the optical-electric characteristic of the tested object 6.

Further, in an illumination device as shown in FIG. 17, light emitted from a light source 7 incidents in an optical fiber light guide 8 which is a bundle of optical fiber elements and exited from its exit terminal. The exited light is projected onto a desired region.

Patent Reference 1: JP-A-2002-90686
Patent Reference 2: JP-A-2002-133926
Patent Reference 3: JP-A-2002-150820
Patent Reference 4: JP-A-2002-289016

Meanwhile, in order that the light transferred by the optical fiber is uniformly exited at its exit terminal, the optical rod must be connected to the exit terminal of the optical fiber, a pressurizing mechanism must be provided for applying pressure to the outer periphery of the optical fiber light guide, the incidence terminal of the optical light guide must be worked out in a concave shape, or a tapered clasp must attached for collecting the incidence terminal of the optical fiber light guide toward the light source. The cost taken therefor has greatly increased. Further, such working gives gave rise to the transfer loss of light. Particularly, where a light emitting diode having a little quantity of light is employed as the light source, the exited light having a required quantity of light could not be obtained.

An object of this invention is to provide a light irradiation device which can transfer the light from a light source to exit the light with a uniform distribution of light quantity without incurring transfer loss and an increase of costs.

DISCLOSURE OF THE INVENTION

In order to attain the above object, this invention provides:
an optical fiber for irradiation-light transfer for exiting from an exit terminal thereof irradiation light incident from an incidence terminal thereof, including:
an annular portion formed by bending an intermediate region thereof in an annular shape; and
a fixing member for fixing a crossing zone of the annular portion.

Further, this invention provides:
an optical fiber for irradiation-light transfer for exiting from an exit terminal thereof irradiation light incident from an incidence terminal thereof, including:
a partial annular portion formed by partially bending an intermediate region thereof in an annular shape; and
a fixing member for fixing a crossing zone of the partial annular portion.

Further, this invention provides:
an optical fiber for irradiation-light transfer for exiting from an exit terminal thereof irradiation light incident from an incidence terminal thereof, including:
partial annular portions formed continuously or intermittently by partially bending an intermediate region thereof in an annular shape.

Further, this invention provides:
an optical fiber for irradiation-light transfer for exiting from an exit terminal thereof irradiation light incident from an incidence terminal thereof, including:
an intermediate region thereof is formed in a three-dimensional annular shape.

The intermediate region of an optical fiber for irradiation-light transfer according to this invention is preferably formed in a spiral shape.

Further, the irradiation light from a plurality of power sources may be incident from the incidence terminal.

Further, the optical fiber for irradiation-light transfer may include a single large diameter optical fiber element.

Further, a bundle optical fiber which includes a plurality of optical fiber elements may be coupled with the incidence terminal.

Further, the radius of curvature at the annular portion is preferably adjustable.

Further, the radius of curvature at the annular portion is preferably fifty or more times as large as the diameter of the fiber.

Further, the radius of curvature at the annular portion is preferably 75 mm or less.

Further, twice or more wound is preferably formed at the annular portion.

Further, this invention provides:
a light irradiation device including:
a light source;
an optical fiber for transferring irradiation light from the light source; and
the optical fiber for irradiation-light transfer as described above.

Additionally, the optical fiber for irradiation-light transfer may be provided inside a case, or may be provided outside the case.

Figure 1:
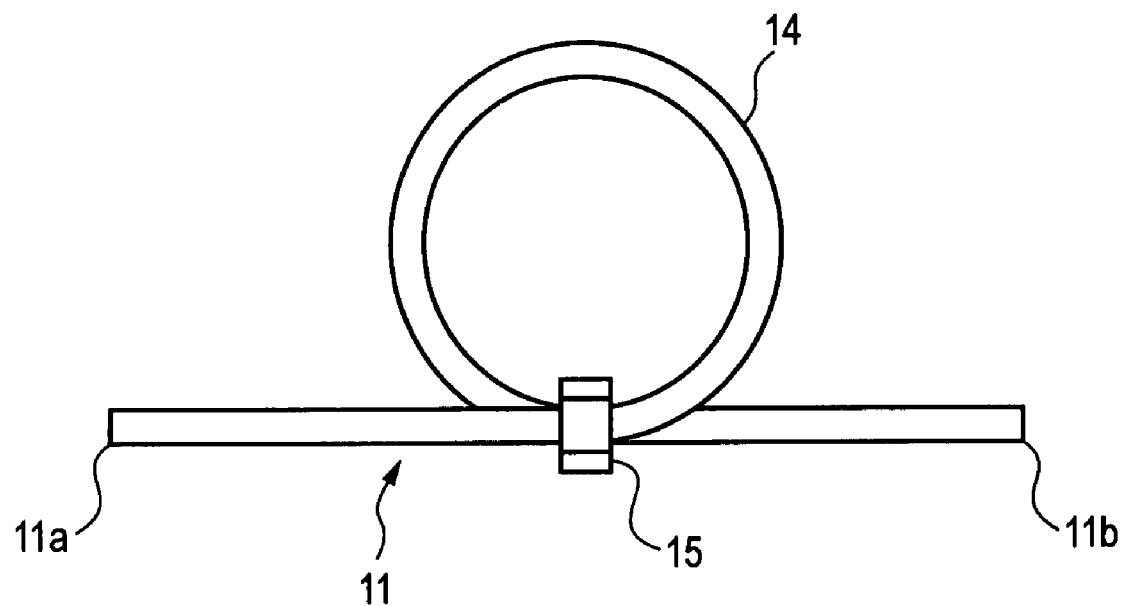
FIG. 1 is a side view of an optical fiber for irradiation-light transfer according to an embodiment of this invention.

As regards the reference numerals and symbols in the drawings, 11, 21 denote an optical fiber for irradiation-light transfer; 11a, 21a denote an incidence terminal; 11b, 21b denotes an exit terminal; 14 denotes an annular portion; 15, 17 denote a fixing member; 31, 34 denote a light source; 32 denotes an optical fiber element; 33 denotes a bundle of optical fibers; 41, 51 denote a light irradiation device; and 42, 52 denote a case.

BEST MODE OF CARRYING OUT THE INVENTION

Figure 2:
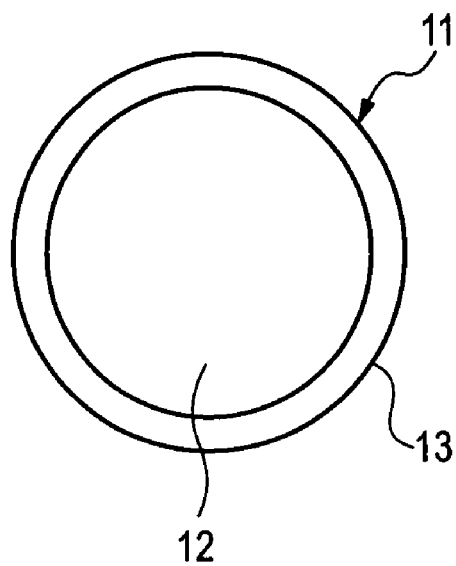
FIG. 2 is a sectional view of an optical fiber for irradiation-light transfer.
Figure 3:
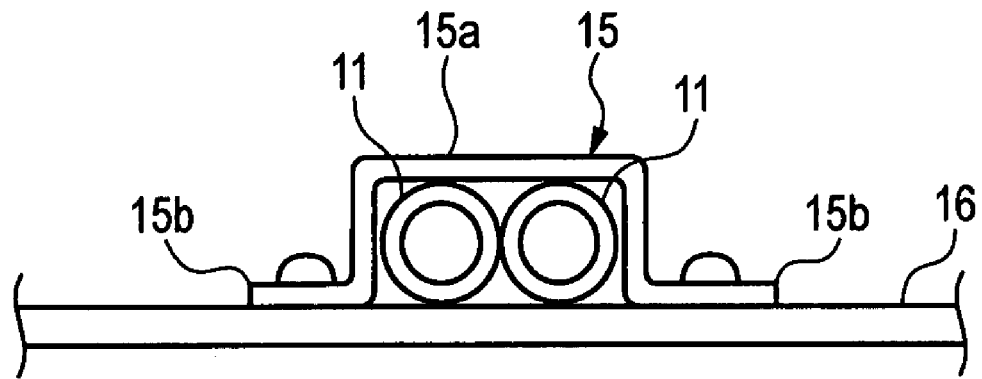
FIG. 3 is a sectional view of a crossing zone at an annular portion.
Figure 4:
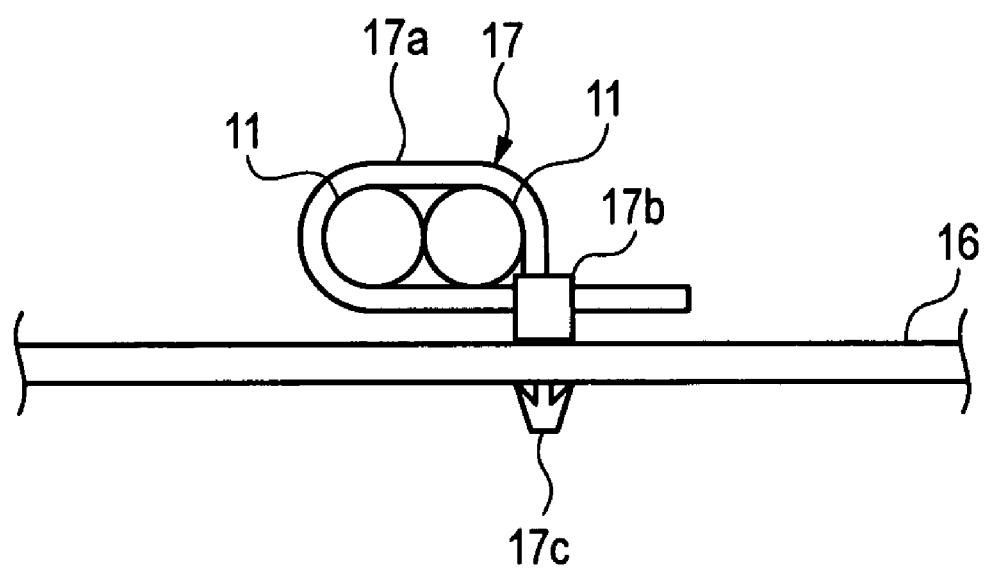
FIG. 4 is a sectional view for explaining another fixing member at the crossing zone.
Figure 5:
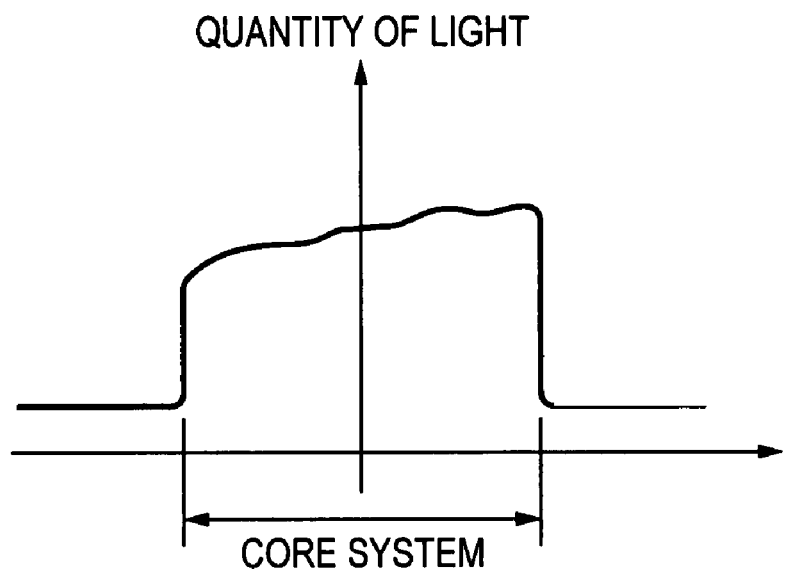
FIG. 5 is a view showing the output distribution of incident light and exit light.
Figure 5:
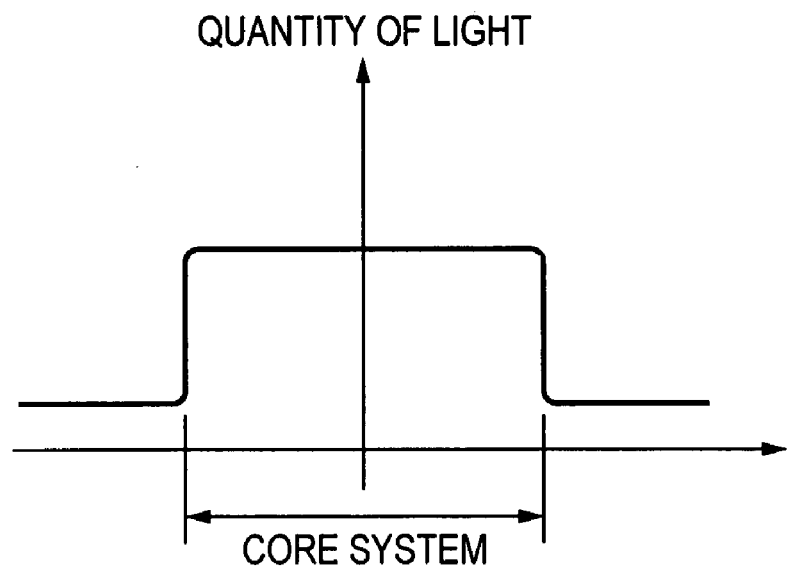

Hereinafter, referring to the drawings, an explanation will be given of the best mode of carrying out the invention. FIG. 1 is a side view of an optical fiber for irradiation-light transfer according to an embodiment of this invention. FIG. 2 is a sectional view of an optical fiber for irradiation-light transfer. FIG. 3 is a sectional view of a crossing zone of an annular portion. FIG. 4 is a sectional view for explaining another fixing member at the crossing zone. FIG. 5 is a view showing the output distribution of incident light and exit light.

As shown in FIG. 1, an optical fiber 11 for irradiation-light transfer has an incidence terminal 11a at the one end and an exit terminal 11b at the other end.

The optical fiber 11 for irradiation-light transfer, as shown in FIG. 2, is a single large diameter optical fiber element including a core 12 and a clad 13. This element has a larger area percentage of the core 12 to the clad 13 than the optical fiber element for signal transfer has.

The optical fiber 11 for irradiation-light transfer has an annular portion 14 bent in an annular shape in its intermediate region. The crossing zone at the annular portion 14 is fixed by a fixing member 15.

As shown in FIG. 3, the fixing member 15 includes a holding segment 15a formed in a U-shape and fixing segments 15a formed at both ends thereof. With the crossing zone of the optical fiber 11 for irradiation-light transfer at the annular portion being arranged within the holding segment 15a, the fixing member 15 secures the crossing zone of the optical fiber 11 for irradiation-light transfer by fixing the fixing segments 15b to e.g. a bottom plate 16 of a device. The curvature of the optical fiber 11 for irradiation-light transfer at the annular portion can be easily adjusted by alleviating the fixed state by the fixing member 15.

Now, the radius of curvature of the optical fiber 11 for irradiation-light transfer at the annular portion 14 is set at 75 mm or less. Further, in order to prevent the optical fiber 11 for irradiation-light transfer from being broken or damaged, the radius of curvature at the annular portion 14 is preferably fifty or more times as large as the diameter of the optical fiber 11 for irradiation-light transfer.

Incidentally, the fixing member 15 should not be limited to the member as described above, but may be replaced by a fixing member 17 of a tying band which ties the crossing zone of the optical fiber 11 for irradiation-light transfer at the annular portion.

This fixing member 17 includes a band segment 17a wound around the optical fiber 11 for irradiation-light transfer and a securing segment 17b which secures the band segment 17a to maintain the tied state of the optical fiber 11 for irradiation-light transfer. The securing zone 17b has an engaging segment 17c to be engageable in a slot or the like formed in the bottom plate 16 of the device.

In the optical fiber 11 for irradiation-light transfer constructed as described above, as shown in FIG. 5(a), even if there are variations in the distribution of light quantity in the irradiation light incident from the incidence terminal 11a, the variations in the distribution of light quantity are eliminated at the annular portion 14 bent in an annular shape so that the light quantity of the irradiation light exited from the exit terminal 11b is uniformly distributed.

As described above, in accordance with the optical fiber 11 for irradiation-light transfer related to the above embodiment, the annular portion 14 bent in the annular shape is provided in the intermediate region and the crossing zone at the annular portion 14 is fixed by the fixing member 15. For this reason, even if there are variations in the distribution of light quantity in the incident light from the incidence terminal 11a, the variations in the distribution of light quantity can be surely eliminated at the annular portion 14. Thus, the light with the uniform distribution of light quantity can be exited from the exit terminal 11b.

Accordingly, without incurring transfer loss and an increase of costs, it is possible to transfer the light emitted from the light source and exit the light with a uniform distribution of light quantity. This is particularly preferable for the case where the light from the light emitting diode having a little quantity of light is transferred.

Figure 6:
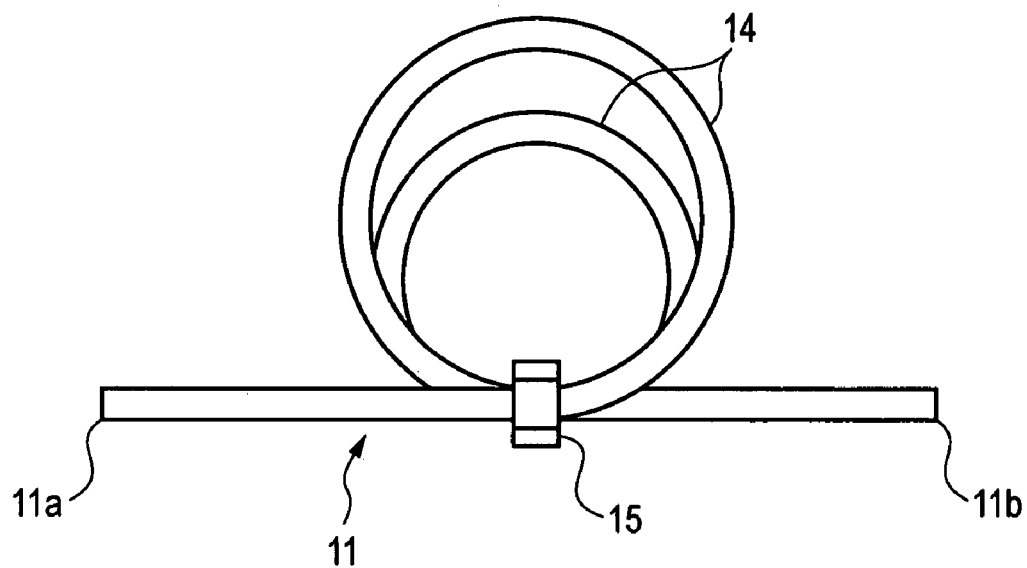
FIG. 6 is a side view of an optical fiber for irradiation-light transfer equipped with an annular portion wound by a plurality of number of turns.

Additionally, in the above embodiment, the optical fiber 11 for irradiation-light transfer is bent only once in the annular shape to form the annular portion 14, but the optical fiber 11 for irradiation-light transfer may be bent not once but twice or more at the annular portion 14, as shown in FIG. 6. By increasing the number of turns of bending at the annular portion 14, the distribution of light quantity in the light exited from the exit terminal can be made more uniform.

Figure 7:
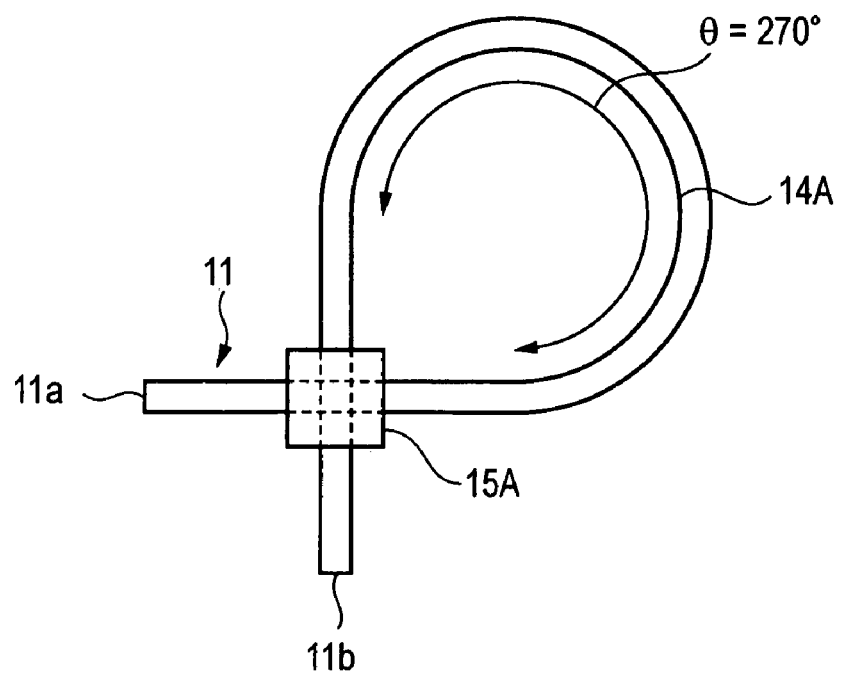
FIG. 7 is a side view of an optical fiber for transferring a partial annular portion.

Further, as shown in FIG. 7, even where the annular portion is not formed in a complete annular shape over 360°, this invention can be realized. In FIG. 7, a partial annular portion 14A bent partially in the annular shape is formed. An example of the bending angle of the partial annular portion 14A is θ=270°. The crossing zone of the optical fiber 11 for irradiation-light transfer is fixed by the fixing member 15A to maintain the partial annular portion 14A.

Figure 8:
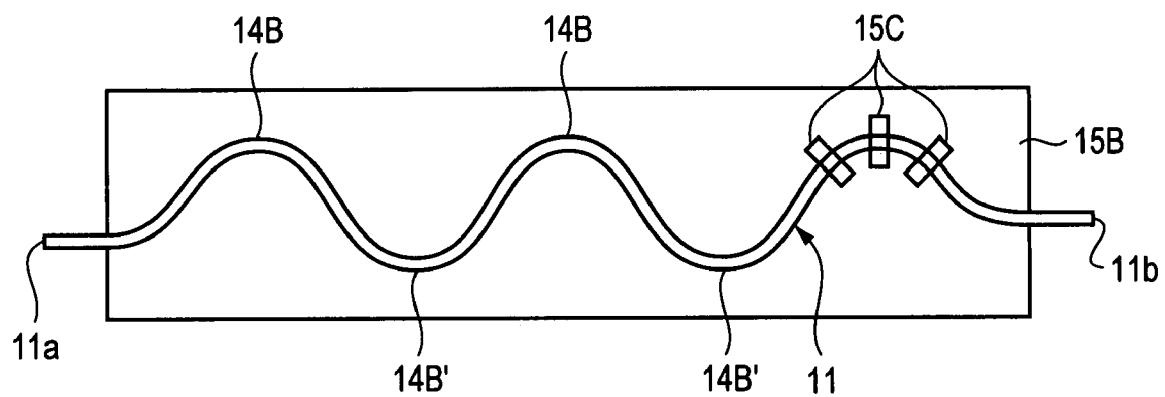
FIG. 8 is a side view of an optical fiber for irradiation-light transfer with partial annular portions formed alternately.

Further, as shown in FIG. 8, also where the optical fiber 11 for irradiation-light transfer is formed in a corrugated shape so that partial annular portions 14B each bent partially in the annular shape and the partial annular portions 14B' inverted from the partial annular portions 14B are alternately formed, the distribution of light quantity in the light exited from the exit terminal 11b can be made uniform. These partial annular portions 14B, 14B' may be inserted and fixed in a groove formed in a partial annular shape in the member 15, may be fixed to the member 15 using an adhesive material, or may be maintained by a plurality of fixing members 15C.

The shape of the partial annular portions is not limited to the corrugated shape, but may be realized in various shapes as long as the distribution of light quantity in the light exited from the exit terminal 11b can be made uniform. The partial annular portions may be formed continuously or intermittently to give a desired bending angle. From the point of view of uniformity of the distribution of light quantity, it is desirable that the total bending angle of the partial annular potions is about 720° or more.

Figure 9:
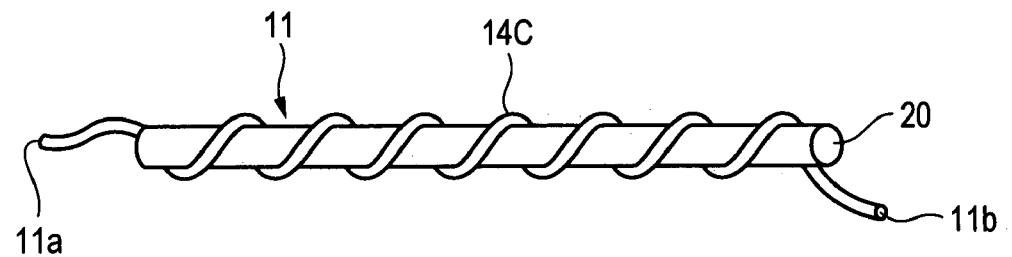
FIG. 9 is a perspective view of an optical fiber for irradiation-light transfer equipped with a three-dimensional annular portion.

The annular portion or partial annular portion of the optical fiber for the irradiation-light transfer according to this invention should not be limited to a two-dimensional shape as described above, but may be a three-dimensional shape. In FIG. 9, as an example of the three-dimensional shape of the annular portion or partial annular portion, the annular portion having a spiral shape is shown. In this example, the optical fiber 11 for irradiation-light transfer is continuously wound around the surface of a cylindrical or round-bar core material to form a spiral three-dimensional annular portion 14C. The method for fixing the three-dimensional annular portion 14C should not be particularly limited. The annular portion 14C may be fixed by applying an adhesive material on the surface of the core material, or may be inserted/fixed in e.g. a spiral groove formed in the core material 20. Further, the three-dimensional shape may be maintained by the plurality of fixing members 15C as shown in FIG. 8. In the case of the spiral annular portion 14C, the number of two or more turns of winding permits the distribution of light quantity can be maintained uniformly.

Next, an explanation will be given of an incidence structure for incidenting irradiation-light into an optical fiber for irradiation-light transfer.

Figure 10:
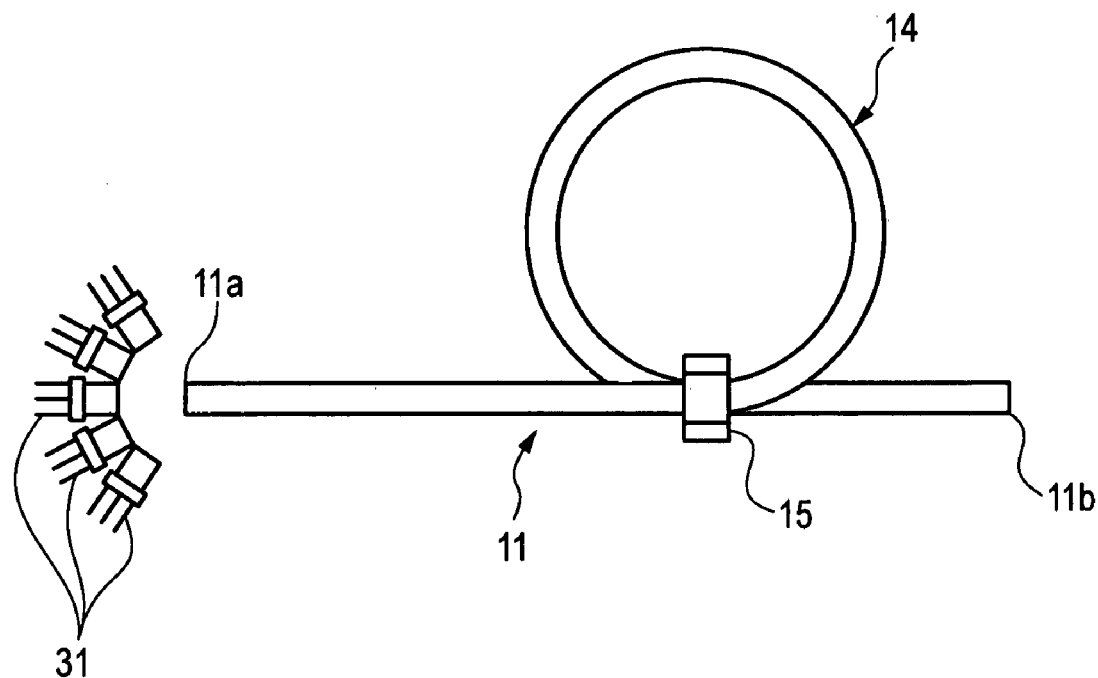
FIG. 10 is a side view of an optical fiber for irradiation-light transfer, which shows an incident structure.

FIG. 10 is a side view of an optical fiber for irradiation-light transfer which shows an incidence structure.

As shown in FIG. 10, at the incidence terminal 11a of the optical fiber 11 for irradiation-light transfer, light sources 31 which are a plurality of light emitting diodes are arranged toward the incidence terminal 11a.

By adopting such an incidence structure, light from the plurality of light sources 31 is incident on the incidence terminal 11a of the optical fiber 11 for irradiation-light transfer. Now, the light incident on the incidence terminal 11a generates variations in the distribution of light quantity owing to the variations in the light quantity of each light source or its inclination to the incidence terminal 11a. However, the variations in the distribution of light quantity are eliminated at the annular portion 14 bent in the annular shape. Thus, from the exit terminal 11b, the light with the light quantity nearly uniformly distributed is exited.

By providing the plurality of light sources 31 as described above, even if some of these light sources 31 do not light, the light can be surely exited from the exit terminal of the optical fiber 11 for irradiation-light transfer. In addition, the distribution of light quantity of the exited light can be made uniform.

Figure 11:
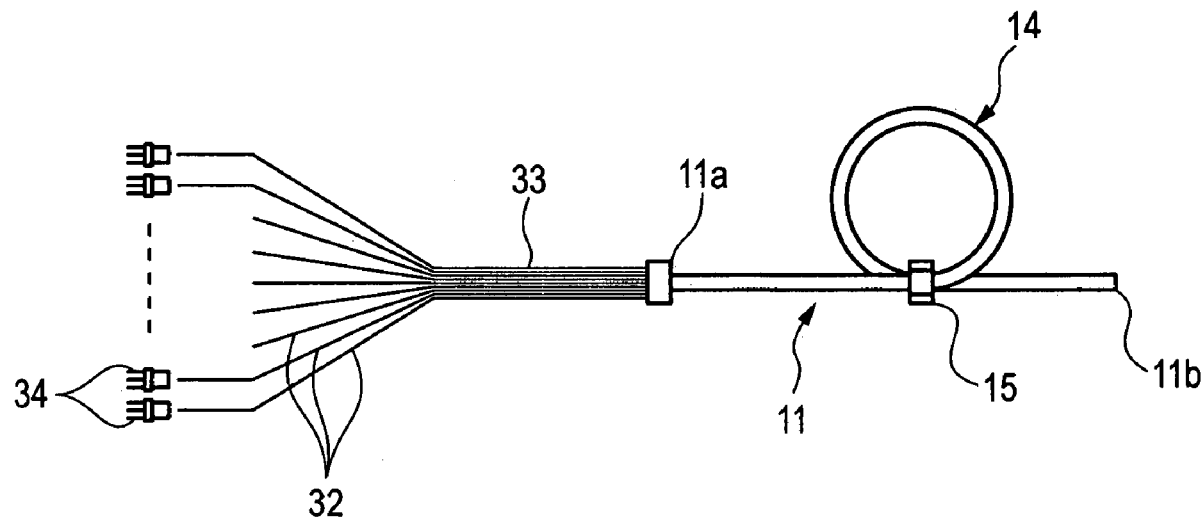
FIG. 11 is a side view of an optical fiber for irradiation-light transfer, which shows another incident structure.

FIG. 11 is a side view of the optical fiber for irradiation-light transfer which shows another incidence structure.

As shown in FIG. 11, a bundle optical fiber 33 which includes a plurality of optical fiber elements is coupled with the incidence terminal 11 of the optical fiber for irradiation-light transfer. The light from each of light sources 34 is incident on each of the optical fiber elements of the bundle optical fiber 33.

By adopting such an incidence structure, the light from the bundle optical fiber 33, which includes the plurality of optical fiber elements 32 on which the light from the light sources 34 is incident, is incident on the incidence terminal 11a of the optical fiber 11 for irradiation-light transfer. Now, the light from the bundle optical fiber 33 incident on the incidence terminal 11a generates variations in the distribution of light quantity owing to the variations in the light quantity of each light source 34. However, the variations in the distribution of light quantity are eliminated at the annular portion 14 bent in the annular shape. Thus, from the exit terminal 11b, the light with the light quantity nearly uniformly distributed is exited. In addition, since the bundle optical fiber 32 composed of the plurality of optical fiber elements 32 is coupled, even if some of the optical fiber elements 32 are broken, the light can be surely exited from the exit terminal of the optical fiber 11 for irradiation-light transfer. In addition, the distribution of light quantity of the exited light can be made uniform.

Next, an explanation will be given of an light irradiation device according to an embodiment of this invention.

Figure 12:
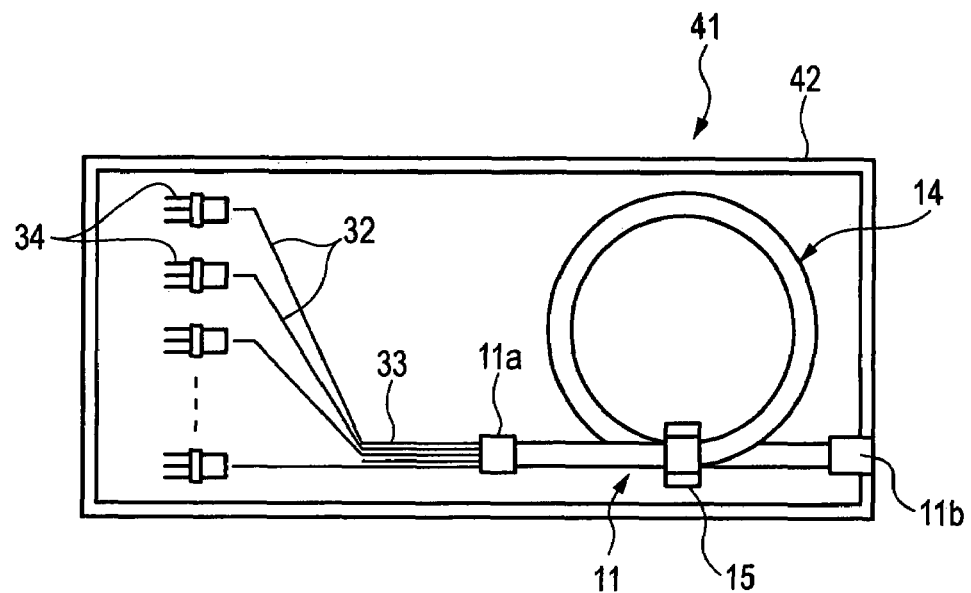
FIG. 12 is a schematic view showing a light irradiation device according to an embodiment of this invention.

FIG. 12 is a schematic view of a light irradiation device according to an embodiment of this invention.

As shown in FIG. 12, a light irradiation device 41 incorporates the optical fiber 11 for irradiation-light transfer inside a case 42.

The crossing zone at the annular portion 14 of the optical fiber 11 for irradiation-light transfer is fixed to a part of the case 42 by the fixing member 15.

The bundle optical fiber 33 which includes the plurality of optical fiber elements 32 is coupled with the incidence terminal 11a of the optical fiber 11 for irradiation-light transfer. The light from each of the light sources 34 is incident on each of the optical fiber elements 32 of the bundle optical fiber 32.

Further, the exit terminal 11b of the optical fiber 11 for irradiation-light transfer is fixed to the one side of the case 42 and its end face is exposed externally.

In this light irradiation device 41, the variations in the light quantity of the light from the bundle optical fiber 33 are made uniform at the annular portion of the optical fiber 11 for irradiation-light transfer. Thus, from the exit terminal 11b, the light with the light quantity nearly uniformly distributed is exited. Further, since the optical fiber 11 for irradiation-light transfer is arranged inside the case 42 and so protected, from the exit terminal 11b of the optical fiber 11 for irradiation-light transfer, uniform light can be always exited.

Figure 13:
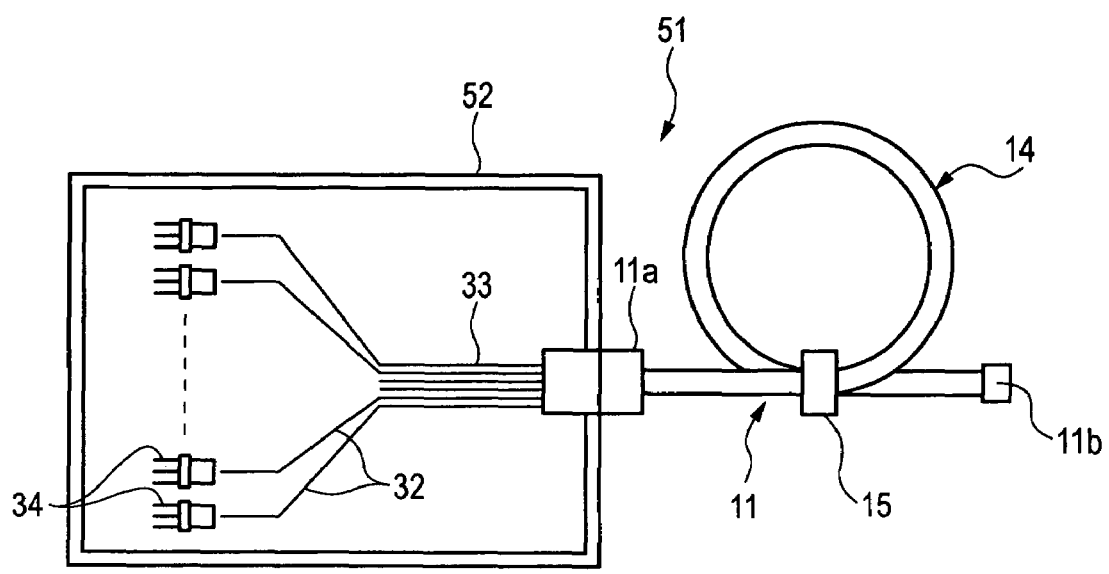
FIG. 13 is a schematic structural view of a light irradiation device having another structure.

FIG. 13 is a schematic structural view of a light irradiation device having another structure.

As shown in FIG. 13, in this light irradiation device 51, the bundle optical fiber 33 which includes the plurality of optical fiber elements 32 is provided inside a case 52. The light from each of the light sources 34 is incident on each of the optical fiber elements 32 of the bundle optical fiber 33.

The one end of the bundle optical fiber 33 is fixed to the one side of the case 52. Further, in this light irradiation device 51, the incidence terminal 11a of the optical fiber 11 for irradiation-light transfer is coupled with the one end of the bundle optical fiber fixed to the one side of the case 52.

In the case of the light irradiation device 51 also, variations in light quantity of the light from the bundle light fiber 33 are made uniform at the annular portion 14 of the optical fiber 11 for irradiation-light transfer. Thus, the exit terminal 11*b*, the light with the light quantity distributed nearly uniformly is exited. In addition, since the optical fiber 11 for irradiation-light transfer is provided outside the case 52, the internal structure of the case can be simplified and the device can be miniaturized. Further, the optical fiber 11 for irradiation-light transfer can be easily replaced by another one.

EXAMPLE 1

(Relationship Between the Radius of Curvature and Uniformity)

Figure 14:
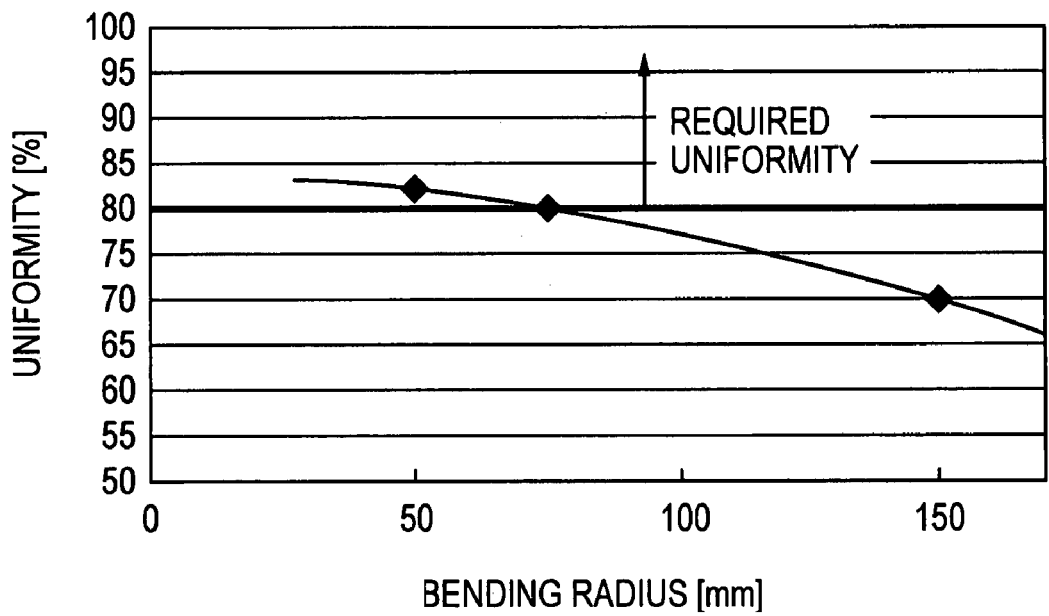
FIG. 14 is a graph showing the relationship between the radius of curvature at an annular portion and uniformity of exit light.

Checking is done for the uniformity of the light exited from the exit terminal 11*b* when the radius of curvature at the annular portion 14 of the optical fiber 11 for irradiation-light transfer having a diameter of 0.88 mm is changed. The checking result is shown in FIG. 14. It should be noted that the uniformity is given on the basis of the following equation.

Equation: uniformity=(maximum value of light quantity−minimum value of light quantity)/average value of light quantity As understood from FIG. 14, it is found that by decreasing the radius of curvature at the annular portion 14, the uniformity of the exited light is increased. As seen from FIG. 14, if the uniformity of 80% or more is required, the radius of curvature must be 75 mm or less.

(Relationship Between the Number of Turns of Bending and Uniformity)

Checking is done for the uniformity of the light exited from the exit terminal 11*b* when the number of turns of bending at the annular portion 14 of the optical fiber 11 for irradiation-light transfer having a diameter of 0.88 mm is changed. The radius of curvature at the annular portion 14 is set at 75 mm. The checking result is shown in FIG. 15.

Figure 15:
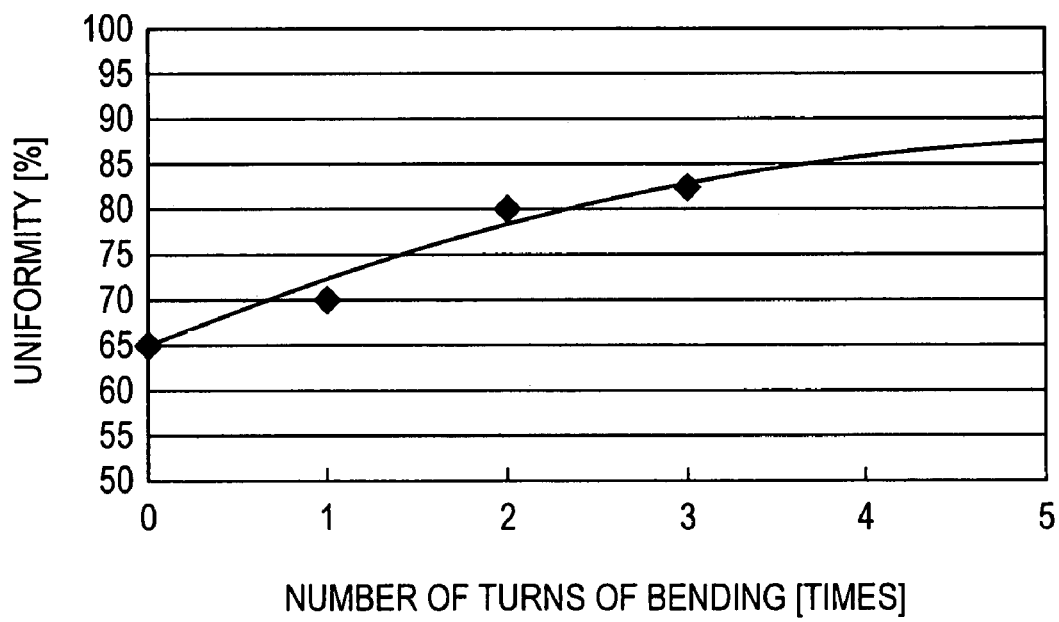
FIG. 15 is a graph showing the relationship between the number of turns of bending and uniformity of exited light.
Figure 16:
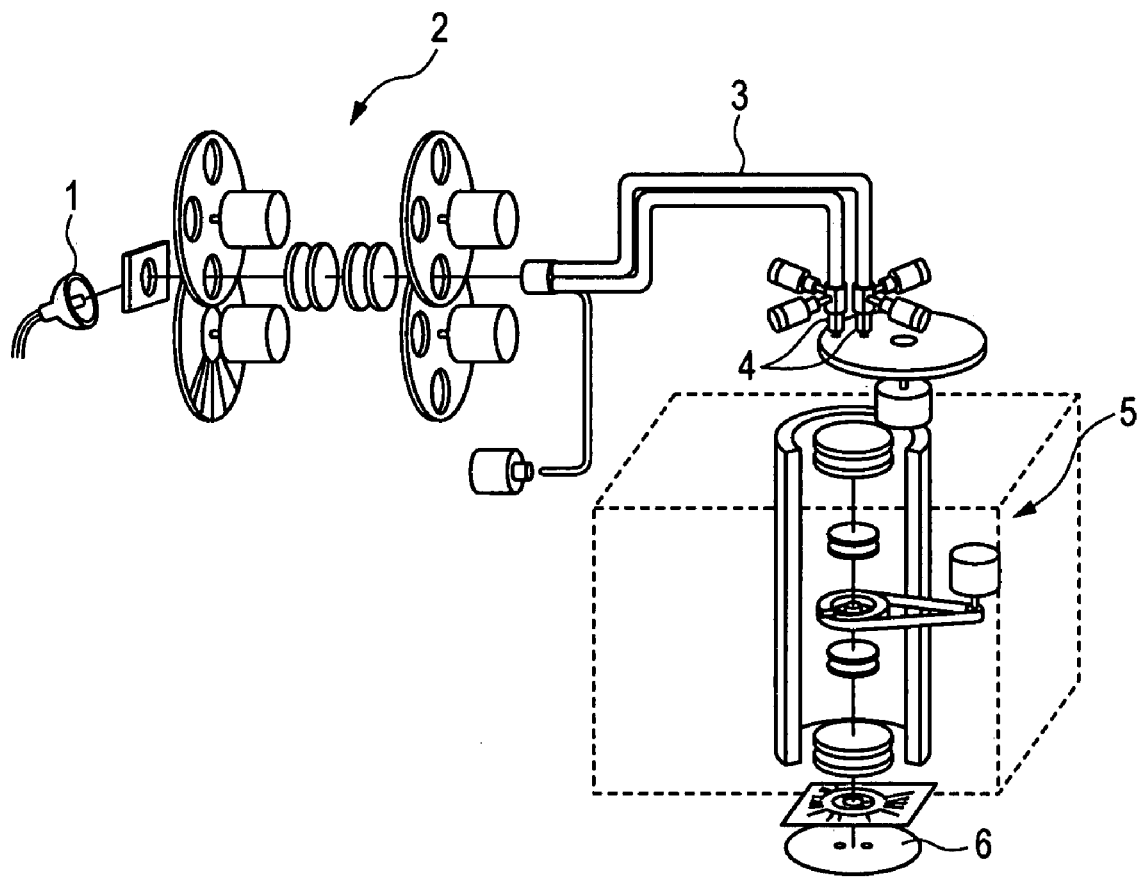
FIG. 16 is a schematic constructive view for explaining a conventional light irradiation device equipped with an optical fiber.
Figure 17:
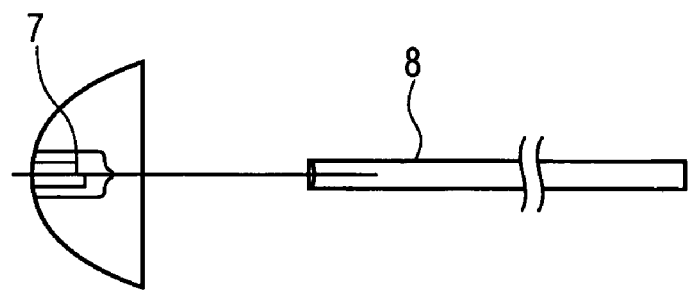
FIG. 17 is a schematic constructive view for explaining a conventional illumination device equipped with an optical fiber.

As shown from FIG. 15, it is found that by increasing the number of turns of bending at the annular portion 14 of the optical fiber 11 for irradiation-light, the uniformity of the exited light is increased.

This invention has been explained in detail and with reference to the specific embodiments, but it is apparent for those skilled in the art that this invention can be changed or modified in various manners without departing from the spirit and scope of the invention.

This application is based on Japanese Patent Application (Japanese Patent Appln. No. 2004-074937) and incorporated herein by reference.

INDUSTRIAL APPLICABILITY

In the optical fiber for irradiation-light transfer according to this invention, since the intermediate region is bent in the annular shape to form the annular portion, the crossing zone at the annular portion is fixed by the fixing member. For this reason, even if there are variations in the distribution of light quantity of the incident light from the incidence terminal, the variations in the distribution of light quantity can be surely eliminated so that the light with the uniform distribution of light quantity can be exited.

Thus, without incurring transfer loss and an increase of costs, it is possible to transfer the light emitted from the light source and exit the light with the uniform distribution of light quantity. This is particularly preferable for the case where the light from the light emitting diode having a little quantity of light is transferred.

The invention claimed is:

1. An optical fiber for irradiation-light transfer for exiting from an exit terminal thereof irradiation light incident from an incidence terminal thereof, comprising:
    an annular portion formed by bending an intermediate region of the optical fiber in an annular shape; and
    a fixing member for fixing and bundling at least two portions of the optical fiber at a crossing zone of the two portions,
    wherein the fixing member provided at the crossing zone is configured to adjust a radius of the annular shape.

2. An optical fiber for irradiation-light transfer for exiting from an exit terminal thereof irradiation light incident from an incidence terminal thereof, comprising:
    a partial annular portion formed by partially bending an intermediate region of the optical fiber in an arc shape; and
    a fixing member for fixing and bundling at least two portions of the optical fiber at a crossing zone of the two portions,
    wherein the fixing member provided at the crossing zone is configured to adjust a radius of the arc shape.

3. An optical fiber for irradiation-light transfer for exiting from an exit terminal thereof irradiation light incident from an incidence terminal thereof comprising:
    a plurality of partial annular portions formed continuously or intermittently by partially bending intermediate regions of the optical fiber in an arc shape, the plurality of partial annular portions are fixed on a member.

4. An optical fiber for irradiation-light transfer for exiting from an exit terminal thereof irradiation light incident from an incidence terminal thereof, comprising:
    an intermediate region of the optical fiber being formed in a spiral shape around a bar.

5. The optical fiber for irradiation-light according to claim 4, wherein
    the irradiation light from a plurality of power sources is incident from the incidence terminal.

6. The optical fiber for irradiation-light according to any one of claims 1 to 3, wherein
    the irradiation light from a plurality of power sources is incident from the incidence terminal.

7. The optical fiber for irradiation-light according to claim 6,
    wherein the optical fiber consists of a single large diameter optical fiber element.

8. The optical fiber for irradiation-light transfer according to claim 7, wherein
    an optical fiber bundle which includes a plurality of optical fiber elements is coupled with the incidence terminal.

9. The optical fiber for irradiation-light transfer according to claim 5, wherein
    the optical fiber consists of a single large diameter optical fiber element.

10. The optical fiber for irradiation-light transfer according to claim 8 wherein
    the radius of curvature at the annular portion or the partial annular portion is fifty or more times as large as the diameter of the optical fiber.

11. The optical fiber for irradiation-light transfer according to claim 10, wherein
    the radius of curvature at the annular portion or the partial annular portion is 75 mm or less.

12. The optical fiber for irradiation-light transfer according to claim 1, wherein twice or more wound is formed at the annular portion.

13. A light irradiation device comprising:
a light source;
an optical fiber for transferring irradiation light from the light source; and
the optical fiber for irradiation-light transfer according to claim 11.

14. The light irradiation device according to claim 13, further comprising a case,
wherein the optical fiber for irradiation-light transfer is provided inside a case.

15. The light irradiation device according to claim 13, further comprising a case,
wherein the optical fiber for irradiation-light transfer is provided outside a case.

16. The optical fiber for irradiation-light transfer according to claim 9, wherein
an optical fiber bundle which includes a plurality of optical fiber elements is coupled with the incidence terminal.

17. A light irradiation device comprising:
a light source;
an optical fiber for transferring irradiation light from the light source; and
the optical fiber for irradiation-light transfer according to claim 16.

18. The light irradiation device according to claim 17, further comprising a case, wherein the optical fiber for irradiation-light transfer is provided inside a case.

19. The light irradiation device according to claim 17, further comprising a case, wherein the optical fiber for irradiation-light transfer is provided outside a case.

* * * * *